Jan. 22, 1957
C. J. OXFORD, JR
2,778,252
SELF-THINNED HEAVY-DUTY TWIST DRILL STRUCTURE
Filed Sept. 26, 1956
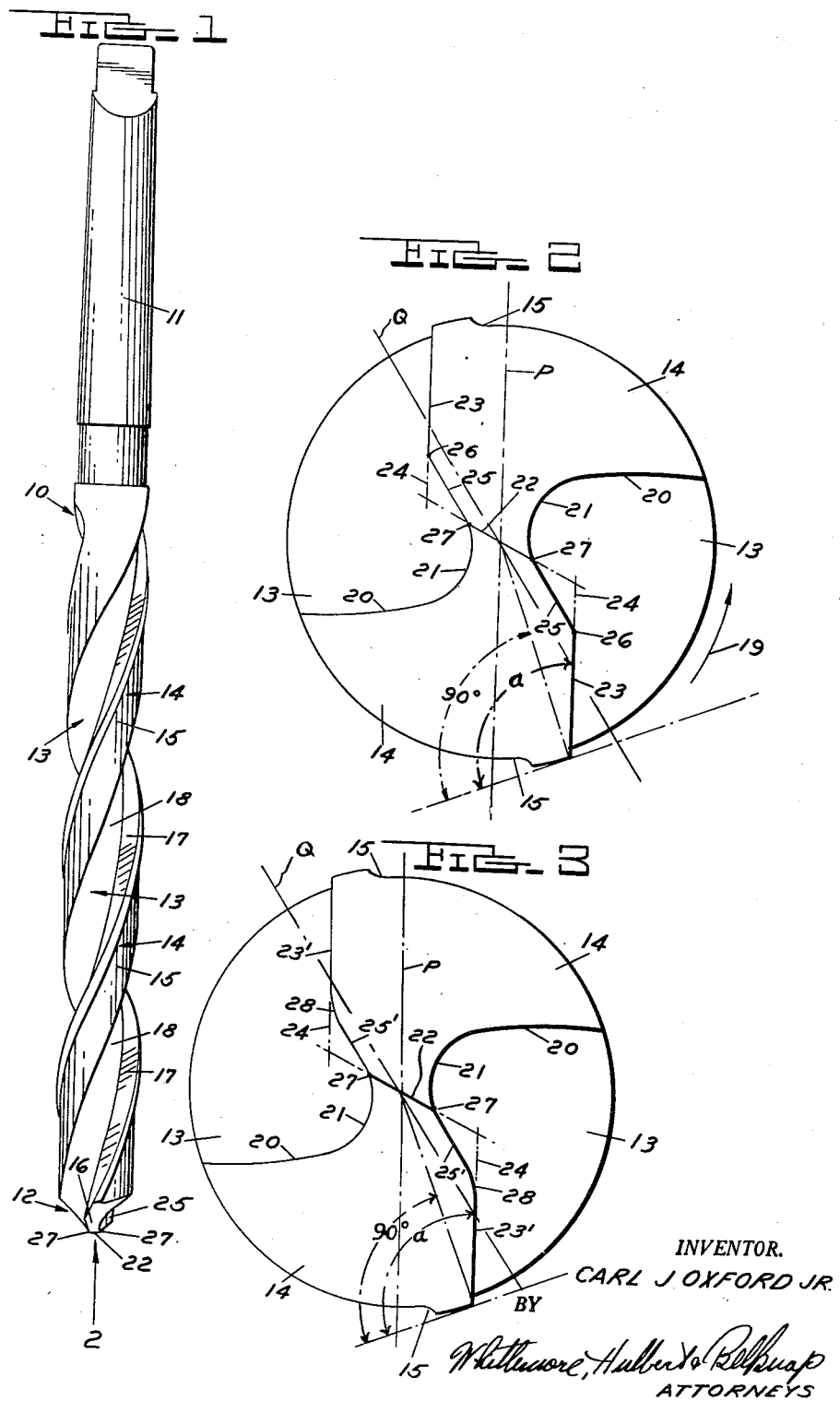
INVENTOR.
CARL J OXFORD JR.
BY
Whittemore, Hulbert & Belknap
ATTORNEYS

United States Patent Office 2,778,252
Patented Jan. 22, 1957

2,778,252

SELF-THINNED HEAVY-DUTY TWIST DRILL STRUCTURE

Carl J. Oxford, Jr., Birmingham, Mich., assignor to National Twist Drill & Tool Company, Rochester, Mich., a corporation of Michigan Application September 26, 1956, Serial No. 612,333

6 Claims. (Cl. 77—70)

This invention relates generally to drills and refers more particularly to improvements in twist drills.

The present application is a continuation-in-part of my prior copending application Serial No. 403,092, filed January 11, 1954, now abandoned.

It is an object of this invention to provide a twist drill having the leading sides of the lands fashioned with contiguous outer and inner surfaces which extend lengthwise of the lands in angular relationship. The outer surfaces extend inwardly from the periphery of the drill and the inner surfaces respectively extend inwardly and rearwardly from the outer surfaces to the web at the center of the drill. The surfaces aforesaid are such that when the drill is sharpened or shaped to form a cutting tip or point, the outer surfaces provide cutting edges which extend inwardly from the periphery of the drill along straight lines extending parallel to a plane including the drill axis and offset from this plane, which may be termed the drill center, in the direction of rotation of the drill. The inner surfaces, on the other hand, provide cutting edges which respectively extend inwardly and rearwardly from the inner ends of the outer cutting edges to the adjacent ends of the chisel edge. The spacing of the outer cutting edges well ahead of the drill center provides additional metal or, in other words, increases the cross-sectional area of the drill to such an extent that the drill is capable of withstanding much higher torsional cutting loads.

The inner cutting edges respectively extend inwardly and rearwardly from the inner ends of the outer cutting edges to opposite ends of the chisel edges. As a result the inner cutting edges are not only spaced throughout their lengths ahead of the drill center but the chisel edge is relatively short and thereby minimizes the thrust load developed by the chisel edge during operation of the drill. Moreover, since the outer and inner surfaces aforesaid extend lengthwise of the lands, the above desired relationship and accuracy of the cutting edges is inherently obtained following each sharpening operation. Also, the length of the chisel edge is inherently maintained within practical limits and the usual difficult and tedious hand forming or web thinning operations heretofore necessary following each sharpening operation is eliminated.

Moreover, since the outer cutting edge of the drill is appreciably ahead of the drill center its inclination to the drill velocity vectors in this region is materially increased. Thus, a higher effective rake angle for a given normal rake angle of the cutting edges is obtained and more efficient removal of metal results. Furthermore, the thrust forces generated by relatively highly inclined portions of the cutting edges are reduced and the effective life of the drill is thereby increased.

It is another object of this invention to provide a twist drill wherein the outer cutting edges intersect the outside diameter of the drill at a much greater obtuse angle than do those of a regular duty or thinned-out heavy duty drill. Thus, a greater portion of the drill material is made available to receive the heat generated in this region during use, and the wear for the outer corners of the primary cutting edges is thereby reduced.

Other objects and features of the invention will become apparent as the description proceeds, especially when taken in conjunction with the accompanying drawing, illustrating preferred embodiments of the invention, wherein:

Figure 1 is a side elevational view of a twist drill constructed in accordance with this invention.

Figure 2 is an enlarged elevational view of the cutting end of the drill shown in Figure 1.

Figure 3 is a view similar to Figure 2 showing a modified construction.

In instances where it is desired to drill a deep hole or holes in relatively tough materials it is usually necessary to use what is commonly known in the art as a heavy duty twist drill. In order to provide the strength and rigidity required for such work, the drill is formed with a much heavier web than usually provided. Unfortunately, this relatively heavy web results in a longer chisel edge at the cutting tip of the drill and this is objectionable because of the higher thrust forces and increased torque required. In fact, the web of so-called heavy duty drills must be thinned to reduce the length of the chisel edge to practical limits and this thinning operation must be repeated each time the drill is resharpened. In most instances, thinning of the web must be done by hand and in any case it is very difficult to perform the thinning operation with the accuracy required to maintain uniformity of the cutting edges and centrality of the web.

In accordance with this invention the above objections are overcome by providing a twist drill wherein the body of the drill possesses the required rigidity for heavy duty operation and wherein the chisel edge remains at a relatively uniform specified length throughout the life of the drill without the necessity of thinning the web or shortening the chisel edge after each resharpening operation. For the purpose of illustrating this invention a double fluted twist drill is shown in the drawing. This drill comprises a body 10, a shank 11 at the inner end of the body 10, and a cutting tip 12 at the outer end of the body 10.

The body 10 is fashioned with two helically extending flutes 13 providing a pair of corresponding helically extending lands 14 having the peripheral surfaces relieved in rear of the leading sides to provide the usual clearance spaces 15. The helix angle of the flutes 13 is not critical in the design of the twist drill forming the subject matter of this invention and may vary from zero to sixty degrees or higher, although in most instances helix angles between ten degrees and forty degrees are preferred. In any case, the two lands 14 are integrally connected by a central web 16.

The leading sides of the lands 14 are each formed with an outer surface 17 and a contiguous inner surface 18 angularly related to the outer surface 17. Both surfaces 17 and 18 extend for the full resharpenable or usable length of the lands 14. The outer surfaces 17 extend inwardly from the periphery of the body 10 of the drill and the inner surfaces 18 respectively extend inwardly and rearwardly from the outer surfaces to opposite sides of the web 16. The trailing sides 20 of the lands are relieved or curved as at 21 beyond the chisel edge to be presently described to provide the specified chip space in the flutes and the required width of the lands 14.

Due to the nature of the surfaces 17 and 18 previously described the geometry noted in Figure 2 of the drawing results when the body 10 is sharpened or shaped to form the tip or point 12. In other words, when the body 10 of the drill is sharpened in the usual manner, the intersection of the flute contour and the clearance surfaces at the ends of the lands 14 form a straight chisel edge 22 and cutting edges 23 and 25. More particularly, the intersection of the outer surfaces 17 and the tip 12 form outer cutting edges 23 which extend inwardly from the periphery of the drill body along straight lines 24 which occupy planes parallel to one another and to a vertical plane P including the axis of the drill. The cutting edges 23 are respectively offset throughout their full length from the plane P in the direction of rotation of the drill, or in other words, are spaced ahead of the drill center. The spacing of the cutting edges 23 in advance of the drill center, in accordance with the present invention, is a distance between one-fifth and one-half of the outside radius of the drill, and in the preferred embodiment of the invention illustrated herein is approximately 35% of the drill radius. Also, it is preferred in practice to provide an angle of intersection between the respective lines 24 and a projection of the chisel edge 22 of 100 degrees to 140 degrees.

The intersection of the inner surfaces 18 and the tip 12 of the drill provides the inner cutting edges 25 which respectively extend outwardly and forwardly from opposite ends of the chisel edge 22 to the inner ends of the outer cutting edges 23. Th inner cutting edges 25 are preferably, although not necessarily, straight but in any case respectively intersect the outer cutting edges at points 26 spaced from the drill axis a distance between two-fifths and three-fifths of the outside radius of the drill, and in the preferred embodiments of the invention illustrated herein, the spacing is approximately equal to one-half of the drill radius. It is to be further understood that while the design of flute shown provides the particular cutting edge contour shown for a particular point or tip angle, nevertheless, this cutting edge contour may be obtained for any practical point or tip angle by merely modifying the flute shape of the drill.

It is important to note that both the outer and inner cutting edges are respectively spaced ahead of the planes P and Q which pass through the drill center. The spacing of the outer cutting edges 23 the specified distance ahead of the drill center not only imparts greater strength to the drill by increasing the cross-sectional area of the metal but, in addition, provides for intersecting the outer cutting edges 23 with the periphery of the drill at an angle (*a*) which is more obtuse than is ordinarily obtainable in twist drills of conventional design. Hence, a greater portion of the drill material is made available adjacent the outer corners of the outer cutting edges 23 to conduct heat away from these corners and thereby reduce wear of the drill in use. Moreover, by spacing the outer cutting edges 23 well ahead of the drill center, the inclination of these edges to the drill velocity vectors is appreciably increased. This greater inclination of the outer cutting edges 23 to the drill velocity vectors provides a higher effective rake angle for a given normal rake angle and hence, assures obtaining greater efficiency in removing metal from a work piece. In addition, the thrust forces generated by outer cutting edges having a high inclination angle are reduced.

As noted above, the inner cutting edges 25 are respectively inclined inwardly and rearwardly from the inner ends of the outer cutting edges 23 to the opposite ends of the chisel edge 22. Thus, the inner cutting edges are not only spaced ahead of the drill center but, in addition, the length of the chisel edge 22 is maintained well within practical limits throughout the resharpenable life of the drill and need not be reduced by thinning the web 16 after each sharpening operation.

The embodiment shown in Figure 3 of the drawing differs from the structure shown in Figures 1 and 2 in that the inner ends of the outer cutting edges 23' are respectively joined to the outer ends of the cutting edges 25' by a radius indicated by the numeral 28. However, vertical planes including the respective cutting edges intersect at the points corresponding to the points 26 previously described in connection with the embodiment of the invention shown in Figures 1 and 2 of the drawings.

The drawing and the foregoing specification constitute a description of the improved self-thinned heavy-duty twist drill structure in such full, clear, concise and exact terms as to enable any person skilled in the art to practice the invention, the scope of which is indicated by the appended claims.

What I claim as my invention is:

1. A self-thinned heavy-duty twist drill having an end portion intended to be ground away in resharpening which is of substantially uniform transverse cross-section longitudinally of said drill, said drill having flutes providing lands connected by a web and having a cutting end provided with a substantially straight chisel edge with its center coincident with the axis of said drill, said lands having at their leading sides contiguous outer and inner surfaces extending lengthwise thereof in angular relationship to each other, the outer surfaces extending inwardly from the periphery of the drill and the inner surfaces extending inwardly from substantially the inner edges of the outer surfaces to the web, the outer and inner surfaces intersecting the sharpened end of said drill to form outer and inner cutting edges, said outer cutting edges being substantially straight and occupying substantially planar surfaces parallel to each other and which surfaces are substantially parallel to and spaced ahead in the direction of rotation of a plane containing the axis of said drill by an amount between one-fifth and one-half of the drill radius, said inner cutting edges extending inwardly and rearwardly with respect to the direction of rotation from substantially the inner ends of said outer cutting edges to the ends of said chisel edge, the inner ends of said outer cutting edges being spaced from the drill axis by an amount between two-fifths and three-fifths of the drill radius, the width of said web interconnecting said lands throughout the resharpenable length of said drill being such as to require no thinning during repeated resharpening.

2. A twist drill as defined in claim 1 in which the inner cutting edges are also substantially straight.

3. A twist drill as defined in claim 1 in which substantially planar surfaces containing the outer cutting edges and parallel to the axis of the drill intersect the axial plane containing said chisel edge at an included angle of between 100 degrees and 140 degrees.

4. A self-thinned heavy-duty twist drill having an end portion intended to be ground away in resharpening which is of substantially uniform transverse cross-section longitudinally of said drill, said drill having flutes providing lands connected by a web and having a cutting end provided with a substantailly straight chisel edge with its center coincident with the axis of said drill, said lands having at their leading sides contiguous outer and inner surfaces extending lengthwise thereof in angular relationship to each other, the outer surfaces extending inwardly from the periphery of the drill and the inner surfaces extending inwardly from substantially the inner edges of the outer surfaces to the web, the outer and inner surfaces intersecting the sharpened end of said drill to form outer and inner cutting edges, said outer cutting edges being substantially straight and occupying substantially planar surfaces parallel to each other and which surfaces are substantially parallel to and spaced ahead in the direction of rotation of a plane containing the axis of said drill by an amount approximately equal to thirty-five percent of the drill radius, said inner cutting edges extending inwardly and rearwardly with respect to the direction of rotation from substantially the inner ends of said outer cutting edges to the ends of said chisel edge, the inner ends of said outer cutting edges being spaced from the drill axis by an amount between two-fifths and three-fifths of the drill radius, the width of said web interconnecting said lands throughout the resharpenable length of said drill being such as to require no thinning during repeated resharpening.

5. A self-thinned heavy-duty twist drill having an end portion intended to be ground away in resharpening which is of substantially uniform transverse cross-section longitudinally of said drill, said drill having flutes providing lands connected by a web and having a cutting end provided with a substantially straight chisel edge with its center coincident with the axis of said drill, said lands having at their leading sides contiguous outer and inner surfaces extending lengthwise thereof in angular relationship to each other, the outer surfaces extending inwardly from the periphery of the drill and the inner surfaces extending inwardly from substantially the inner edges of the outer surfaces to the web, the outer and inner surfaces intersecting the sharpened end of said drill to form outer and inner cutting edges, said outer cutting edges being substantially straight and occupying substantially planar surfaces parallel to each other and which surfaces are substantially parallel to and spaced ahead in the direction of rotation of a plane containing the axis of said drill by an amount between one-fifth and one-half of the drill radius, said inner cutting edges extending inwardly and rearwardly with respect to the direction of rotation from substantially the inner ends of said outer cutting edges to the ends of said chisel edge, the inner ends of said outer cutting edges being spaced from the drill axis by an amount approximately equal to one-half the drill radius, the width of said web interconnecting said lands throughout the resharpenable length of said drill being such as to require no thinning during repeated resharpening.

6. A self-thinned heavy-duty twist drill having an end portion intended to be ground away in resharpening which is of substantially uniform transverse cross-section longitudinally of said drill, said drill having flutes providing lands connected by a web and having a cutting end provided with a substantially straight chisel edge with its center coincident with the axis of said drill, said lands having at their leading sides contiguous outer and inner surfaces extending lengthwise thereof in angular relationship to each other, the outer surfaces extending inwardly from the periphery of the drill and the inner surfaces extending inwardly from substantially the inner edges of the outer surfaces to the web, the outer and inner surfaces intersecting the sharpened end of said drill to form outer and inner cutting edges, said outer cutting edges being substantially straight and occupying substantially planar surfaces parallel to each other and which surfaces are substantially parallel to and spaced ahead in the direction of rotation of a plane containing the axis of said drill by an amount approximately equal to thirty-five percent of the drill radius, said inner cutting edges extending inwardly and rearwardly with respect to the direction of rotation from substantially the inner ends of said outer cutting edges to the ends of said chisel edge, the inner ends of said outer cutting edges being spaced from the drill axis by an amount approximately equal to one-half the drill radius, the width of said web interconnecting said lands throughout the resharpenable length of said drill being such as to require no thinning during repeated resharpening.

References Cited in the file of this patent

FOREIGN PATENTS 698,003    Germany _____ Oct. 30, 1940